(12) United States Patent
Tanoue

(10) Patent No.: US 11,525,953 B2
(45) Date of Patent: Dec. 13, 2022

(54) LIGHT GUIDE PLATE, DISPLAY DEVICE, INPUT DEVICE, AND APPARATUS INCLUDING DISPLAY DEVICE

(71) Applicant: OMRON Corporation, Kyoto (JP)

(72) Inventor: Yasuhiro Tanoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/672,793

(22) Filed: Feb. 16, 2022

(65) Prior Publication Data

US 2022/0291441 A1    Sep. 15, 2022

(30) Foreign Application Priority Data

Mar. 12, 2021    (JP) ............................. JP2021-040828

(51) Int. Cl.
*F21V 8/00*    (2006.01)
*G06F 1/16*    (2006.01)
*G02B 30/22*    (2020.01)

(52) U.S. Cl.
CPC ......... *G02B 6/0055* (2013.01); *G06F 1/1684* (2013.01); *G02B 30/22* (2020.01)

(58) Field of Classification Search
CPC ...... G02B 6/0055; G02B 30/22; G06F 1/1684
See application file for complete search history.

(56) References Cited

U.S. PATENT DOCUMENTS

2019/0179161 A1\*  6/2019  Shinohara ............ G02B 6/0035

FOREIGN PATENT DOCUMENTS

JP           2018-10223 A    1/2018

\* cited by examiner

*Primary Examiner* — Alexander Eisen
*Assistant Examiner* — Cory A Almeida
(74) *Attorney, Agent, or Firm* — Metrolex IP Law Group, PLLC

(57) ABSTRACT

A light guide plate according to one or more embodiments may include a plurality of optical path deflectors arranged in a matrix. Each of the plurality of optical path deflectors may include a plurality of optical path deflector sets. The plurality of optical path deflectors may include a first cell and a second cell located periodically. The first cell may include a first deflector that deflects light within a first angle range. The first cell may be free of a second deflector that deflects light within a second angle range adjacent to the first angle range. The second cell may be free of the first deflector and may include the second deflector.

20 Claims, 10 Drawing Sheets

|   | 1 | 2 | 3 | 4 | 5 | 6 | 7 | 8 |
|---|---|---|---|---|---|---|---|---|
| 1 | ◎ | ◎ | ◎ | ◎ | ◎ | ◎ | ◎ | ◎ |
| 2 | ◎ | ◎ | ◎ | ◎ | ◎ | ◎ | ◎ | ◎ |
| 3 | ◎ | ◎ | ◎ | ◎ | ◎ | ◎ | ◎ | ◎ |
| 4 | ◎ | ◎ | ◎ | ◎ | ◎ | ◎ | ◎ | ◎ |
| 5 | ◎ | ◎ | ◎ | ◎ | ◎ | ◎ | ◎ | ◎ |
| 6 | ◎ | ◎ | ◎ | ◎ | ◎ | ◎ | ◎ | ◎ |
| 7 | ◎ | ◎ | ◎ | ◎ | ◎ | ◎ | ◎ | ◎ |
| 8 | ◎ | ◎ | ◎ | ◎ | ◎ | ◎ | ◎ | ◎ |

FIG. 12

Arrangement A

|   | 1 | 2 | 3 | 4 | 5 | 6 | 7 | 8 |
|---|---|---|---|---|---|---|---|---|
| 1 | ● |   | ● |   | ● |   | ● |   |
| 2 |   | ● |   | ● |   | ● |   | ● |
| 3 | ● |   | ● |   | ● |   | ● |   |
| 4 |   | ● |   | ● |   | ● |   | ● |
| 5 | ● |   | ● |   | ● |   | ● |   |
| 6 |   | ● |   | ● |   | ● |   | ● |
| 7 | ● |   | ● |   | ● |   | ● |   |
| 8 |   | ● |   | ● |   | ● |   | ● |

Arrangement B

|   | 1 | 2 | 3 | 4 | 5 | 6 | 7 | 8 |
|---|---|---|---|---|---|---|---|---|
| 1 |   | ● |   | ● |   | ● |   | ● |
| 2 | ● |   | ● |   | ● |   | ● |   |
| 3 |   | ● |   | ● |   | ● |   | ● |
| 4 | ● |   | ● |   | ● |   | ● |   |
| 5 |   | ● |   | ● |   | ● |   | ● |
| 6 | ● |   | ● |   | ● |   | ● |   |
| 7 |   | ● |   | ● |   | ● |   | ● |
| 8 | ● |   | ● |   | ● |   | ● |   |

FIG. 13

Arrangement A

|   | 1 | 2 | 3 | 4 | 5 | 6 | 7 | 8 |
|---|---|---|---|---|---|---|---|---|
| 1 | ● |   | ● |   | ● |   | ● |   |
| 2 | ● |   | ● |   | ● |   | ● |   |
| 3 |   | ● |   | ● |   | ● |   | ● |
| 4 |   | ● |   | ● |   | ● |   | ● |
| 5 | ● |   | ● |   | ● |   | ● |   |
| 6 | ● |   | ● |   | ● |   | ● |   |
| 7 |   | ● |   | ● |   | ● |   | ● |
| 8 |   | ● |   | ● |   | ● |   | ● |

Arrangement B

|   | 1 | 2 | 3 | 4 | 5 | 6 | 7 | 8 |
|---|---|---|---|---|---|---|---|---|
| 1 |   | ● |   | ● |   | ● |   | ● |
| 2 |   | ● |   | ● |   | ● |   | ● |
| 3 | ● |   | ● |   | ● |   | ● |   |
| 4 | ● |   | ● |   | ● |   | ● |   |
| 5 |   | ● |   | ● |   | ● |   | ● |
| 6 |   | ● |   | ● |   | ● |   | ● |
| 7 | ● |   | ● |   | ● |   | ● |   |
| 8 | ● |   | ● |   | ● |   | ● |   |

FIG. 14

Arrangement A

|   | 1 | 2 | 3 | 4 | 5 | 6 | 7 | 8 |
|---|---|---|---|---|---|---|---|---|
| 1 | ● |   | ● |   | ● |   | ● |   |
| 2 |   |   |   |   |   |   |   |   |
| 3 | ● |   | ● |   | ● |   | ● |   |
| 4 |   |   |   |   |   |   |   |   |
| 5 | ● |   | ● |   | ● |   | ● |   |
| 6 |   |   |   |   |   |   |   |   |
| 7 | ● |   | ● |   | ● |   | ● |   |
| 8 |   |   |   |   |   |   |   |   |

Arrangement B

|   | 1 | 2 | 3 | 4 | 5 | 6 | 7 | 8 |
|---|---|---|---|---|---|---|---|---|
| 1 |   | ● |   | ● |   | ● |   | ● |
| 2 |   |   |   |   |   |   |   |   |
| 3 |   | ● |   | ● |   | ● |   | ● |
| 4 |   |   |   |   |   |   |   |   |
| 5 |   | ● |   | ● |   | ● |   | ● |
| 6 |   |   |   |   |   |   |   |   |
| 7 |   | ● |   | ● |   | ● |   | ● |
| 8 |   |   |   |   |   |   |   |   |

Arrangement C

|   | 1 | 2 | 3 | 4 | 5 | 6 | 7 | 8 |
|---|---|---|---|---|---|---|---|---|
| 1 |   |   |   |   |   |   |   |   |
| 2 | ● |   | ● |   | ● |   | ● |   |
| 3 |   |   |   |   |   |   |   |   |
| 4 | ● |   | ● |   | ● |   | ● |   |
| 5 |   |   |   |   |   |   |   |   |
| 6 | ● |   | ● |   | ● |   | ● |   |
| 7 |   |   |   |   |   |   |   |   |
| 8 | ● |   | ● |   | ● |   | ● |   |

Arrangement D

|   | 1 | 2 | 3 | 4 | 5 | 6 | 7 | 8 |
|---|---|---|---|---|---|---|---|---|
| 1 |   |   |   |   |   |   |   |   |
| 2 |   | ● |   | ● |   | ● |   | ● |
| 3 |   |   |   |   |   |   |   |   |
| 4 |   | ● |   | ● |   | ● |   | ● |
| 5 |   |   |   |   |   |   |   |   |
| 6 |   | ● |   | ● |   | ● |   | ● |
| 7 |   |   |   |   |   |   |   |   |
| 8 |   | ● |   | ● |   | ● |   | ● |

Arrangement A

|   | 1 | 2 | 3 | 4 | 5 | 6 | 7 | 8 |
|---|---|---|---|---|---|---|---|---|
| 1 | ● |   |   |   | ● |   |   |   |
| 2 |   |   | ● |   |   |   | ● |   |
| 3 | ● |   |   |   | ● |   |   |   |
| 4 |   |   | ● |   |   |   | ● |   |
| 5 | ● |   |   |   | ● |   |   |   |
| 6 |   |   | ● |   |   |   | ● |   |
| 7 | ● |   |   |   | ● |   |   |   |
| 8 |   |   | ● |   |   |   | ● |   |

Arrangement C

|   | 1 | 2 | 3 | 4 | 5 | 6 | 7 | 8 |
|---|---|---|---|---|---|---|---|---|
| 1 |   | ● |   |   |   | ● |   |   |
| 2 |   |   |   | ● |   |   |   | ● |
| 3 |   | ● |   |   |   | ● |   |   |
| 4 |   |   |   | ● |   |   |   | ● |
| 5 |   | ● |   |   |   | ● |   |   |
| 6 |   |   |   | ● |   |   |   | ● |
| 7 |   | ● |   |   |   | ● |   |   |
| 8 |   |   |   | ● |   |   |   | ● |

Arrangement B

|   | 1 | 2 | 3 | 4 | 5 | 6 | 7 | 8 |
|---|---|---|---|---|---|---|---|---|
| 1 |   |   | ● |   |   |   | ● |   |
| 2 | ● |   |   |   | ● |   |   |   |
| 3 |   |   | ● |   |   |   | ● |   |
| 4 | ● |   |   |   | ● |   |   |   |
| 5 |   |   | ● |   |   |   | ● |   |
| 6 | ● |   |   |   | ● |   |   |   |
| 7 |   |   | ● |   |   |   | ● |   |
| 8 | ● |   |   |   | ● |   |   |   |

Arrangement D

|   | 1 | 2 | 3 | 4 | 5 | 6 | 7 | 8 |
|---|---|---|---|---|---|---|---|---|
| 1 |   |   |   | ● |   |   |   | ● |
| 2 |   | ● |   |   |   | ● |   |   |
| 3 |   |   |   | ● |   |   |   | ● |
| 4 |   | ● |   |   |   | ● |   |   |
| 5 |   |   |   | ● |   |   |   | ● |
| 6 |   | ● |   |   |   | ● |   |   |
| 7 |   |   |   | ● |   |   |   | ● |
| 8 |   | ● |   |   |   | ● |   |   |

LIGHT GUIDE PLATE, DISPLAY DEVICE, INPUT DEVICE, AND APPARATUS INCLUDING DISPLAY DEVICE

CROSS-REFERENCE TO RELATED APPLICATION

This application claims priority to Japanese Patent Application No. 2021-040828 filed on Mar. 12, 2021, the contents of which are incorporated herein by reference.

FIELD

The disclosure relates to, for example, a light guide plate for displaying a stereoscopic image.

BACKGROUND

A known light guide plate and a known optical device for displaying a stereoscopic image are described in, for example, Patent Literature 1.

An optical device 1A described in Patent Literature 1 includes a light guide plate 10 and multiple optical path deflectors 20 included in the light guide plate 10 (FIG. 1). The light guide plate 10 guides incident light from the light source 2 to cause light to be emitted through the emission surface 12. Each optical path deflector 20 deflects the guided light to cause the light to be emitted to form an image in a space. The optical path deflector 20 includes a plane image optical path deflector set 21 and a contour image optical path deflector set 24. The plane image optical path deflector set 21 deflects guided light to be emitted to form a plane image FI in a space. The contour image optical path deflector set 24 deflects guided light to be emitted to form a contour image BI in the space.

CITATION LIST

Patent Literature

Patent Literature 1: Japanese Unexamined Patent Application Publication No. 2018-010223

SUMMARY

The known optical device 1A may be improved as described below.

FIG. 1 in Patent Literature 1 shows a stereoscopic image I formed in a space. The stereoscopic image I in the figure includes three plane images FI. To create tone differences between the three plane images FI, some of the plane image optical path deflector sets 21 on the light guide plate corresponding to portions of the plane images FI may not be used (may be eliminated). Such a structure will be described with reference to FIG. 16 and FIG. 17.

FIG. 16 is a diagram of a known light guide plate 100 with all optical path deflector sets 200 causing light to be emitted. As shown in the figure, all the optical path deflector sets 200 cause light to be emitted to form an image in the air. The tone value is 100 in such a state.

FIG. 17 is a diagram of the known light guide plate 100 with optical path deflector sets 200 that cause light to be emitted and optical path deflector sets 200 that do not cause light to be emitted, which are located alternately. The structure shown in FIG. 17 is designed to reproduce a tone value of 50, which is 50% of the tone value of 100 reproduced with the structure shown in FIG. 16. The broken lines in the figure indicate the optical path deflector sets 200 that are eliminated and schematically indicate light not being emitted. With the structure shown in FIG. 17, light emitted from selected sets of the optical path deflector sets 200 does not form an image in the air, and their luminous points are fixed when viewed in any direction by a viewer. An image to appear in a space appears at a protruding distance of 0, or on the light guide plate 100.

To create tone differences between the three plane images FI shown in FIG. 1 in Patent Literature 1, the lengths (or heights) of prisms may be adjusted as shown in FIG. 13 in Patent Literature 1. Such an adjustment method will be described with reference to FIG. 18.

FIG. 18 is a schematic top view of triangular prisms with different lengths included in an optical path deflector set. As shown in the figure, prisms 1000, 1001, and 1002 have respective lengths of 4L, 2L, and L, and each have a width of W. The prism 1000 reproduces a tone value of 100. The prism 1001 with a length of 2L has brightness equivalent to 50% of the brightness of the prism 1000 and reproduces a tone value of 50. The prism 1002 with a length of L has brightness equivalent to 25% of the brightness of the prism 1000 and reproduces a tone value of 25.

With its machining limitations, a prism typically cannot have a length of less than 50 µm. When 4L=100 µm, a prism cannot typically have a length of shorter than 2L (or the prism 1002). Under such machining limitations, the design may satisfy 4L=200 µm. However, such a design increases the size of the optical path deflector set, thus lowering the resolution of the optical device. Changing the shapes of the prisms alone may face machining limitations and resolution reduction.

One or more embodiments are directed to a technique that may include a light guide plate for displaying a stereoscopic image with improved tone representation in a space.

A light guide plate according to one or more embodiments is a light guide plate for displaying a predetermined image as a real image or a virtual image in a space. The light guide plate includes a plurality of cells arranged in a matrix. Each of the plurality of cells includes a plurality of deflectors that deflect light incident on the light guide plate in a plurality of directions for emission. The plurality of cells include a first cell and a second cell located periodically. The first cell includes a first deflector that deflects light within a first angle range to display a plurality of dots included in a halftone line or a halftone surface of the predetermined image. The first cell is free of a second deflector that deflects light within a second angle range adjacent to the first angle range. The second cell is free of the first deflector and includes the second deflector.

A light guide plate with the above structure according to one or more embodiments may reduce image points in the air. A light guide plate according to one or more embodiments may thus display, in the air, a stereoscopic image appearing stereoscopic and having improved tone representation.

In a light guide plate according to one or more embodiments, the first cell may include a third deflector that deflects light within a third angle range adjacent to the second angle range. The second cell may be free of the third deflector.

In a light guide plate according to one or more embodiments, the first cell and the second cell may be located alternately.

A light guide plate with the above structure according to one or more embodiments may thus display, in the air, a stereoscopic image appearing stereoscopic and having improved tone representation.

In a light guide plate according to one or more embodiments, each of the first cell and the second cell may be free of a third deflector that deflects light within a third angle range adjacent to the second angle range and may be free of a fourth deflector that deflects light within a fourth angle range adjacent to the third angle range. The light guide plate may further include a third cell including the third deflector and being free of the first deflector, the second deflector, and the fourth deflector, and a fourth cell including the fourth deflector and being free of the first deflector, the second deflector, and the third deflector. The first cell, the second cell, the third cell, and the fourth cell may be located periodically.

A light guide plate with the above structure according to one or more embodiments may lower the tone value further. A light guide plate according to one or more embodiments may thus display, in the air, a stereoscopic image appearing stereoscopic and having further improved tone representation.

In a light guide plate according to one or more embodiments, the plurality of deflectors may include at least one deflector with at least a length or a height different from at least a length or a height of another of the plurality of deflectors.

A light guide plate with the above structure according to one or more embodiments may display, in the air, stereoscopic images with more variations in tone value by changing the shape of one or more deflectors.

A display device according to one or more embodiments may include the light guide plate according to any one of the above aspects, and a light source that emits light to be incident on the light guide plate.

An input device according to one or more embodiments may include the above described display device, and a sensor that detects an object.

An apparatus according to one or more embodiments may include the above described display device.

A display device, an input device, and an apparatus according to one or more embodiments with the above structure may display a stereoscopic image with improved tone representation in a space.

A light guide plate according to one or more embodiments may display a stereoscopic image with improved tone representation in a space.

BRIEF DESCRIPTION OF THE DRAWINGS

FIG. 12 is a diagram illustrating light emission on a light guide plate according to one or more embodiments for a tone value of 50.

FIG. 13 is a diagram illustrating light emission on a light guide plate according to one or more embodiments for a tone value of 50.

FIG. 14 is a diagram illustrating light emission on a light guide plate according to one or more embodiments for a tone value of 25.

DETAILED DESCRIPTION

One or more embodiments will now be described with reference to the drawings.

First Embodiment

Figure 1:
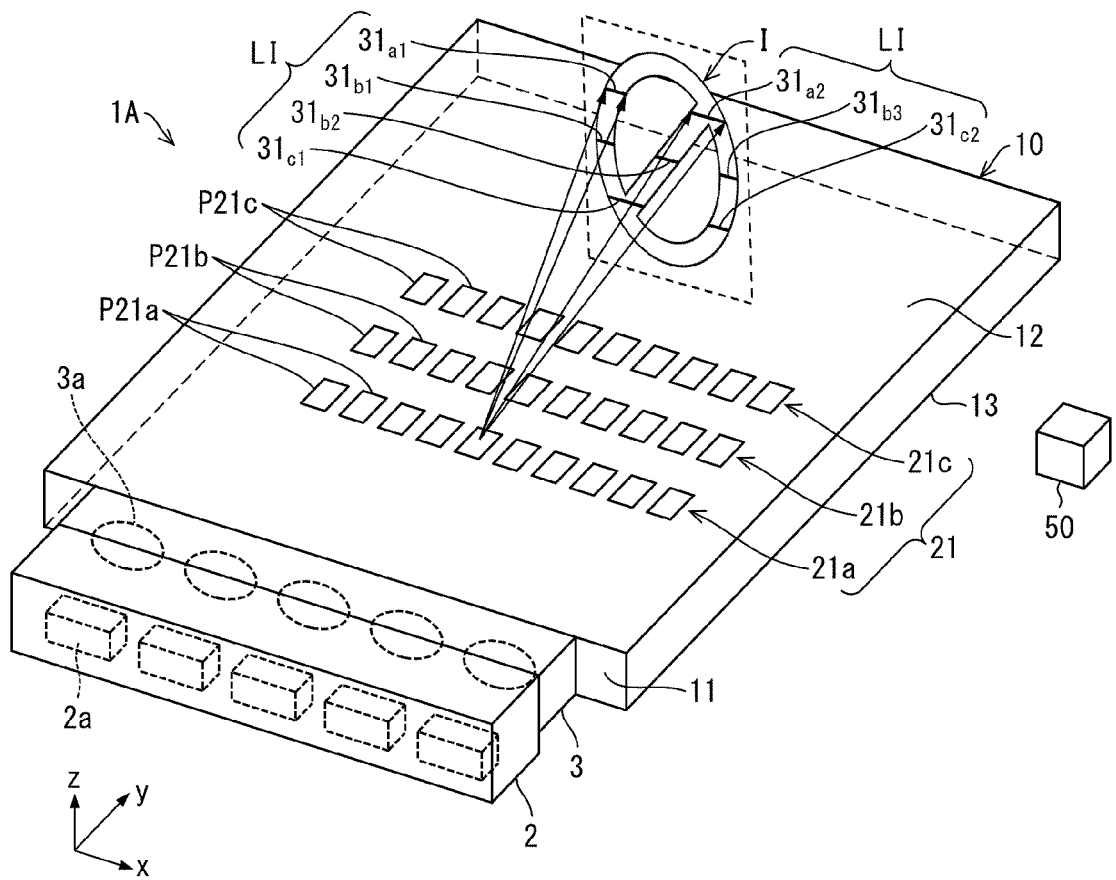
FIG. 1 is a diagram illustrating a perspective view of an optical device according to one or more embodiments.
Figure 2:
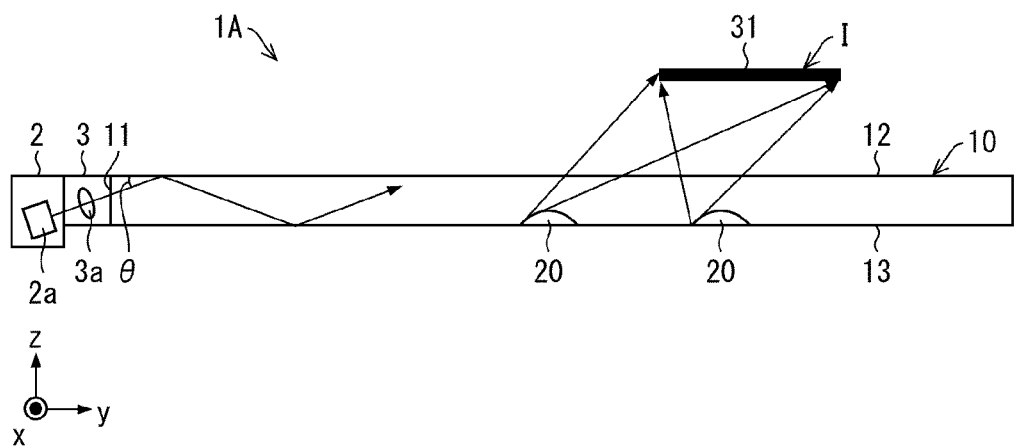
FIG. 2 is a diagram illustrating a cross-sectional view of an optical device according to one or more embodiments.

One or more embodiments will now be described with reference to, for example, FIG. 1.
Structure of Optical Device FIG. 1 is a perspective view of an optical device 1A. FIG. 2 is a cross-sectional view of the optical device 1A. The structure of the optical device 1A according to the present embodiment will now be described with reference to FIGS. 1 and 2.

As shown in FIG. 1, the optical device 1A includes a light source 2, a light guide plate 10 that guides incident light from the light source 2 to be emitted through an emission surface 12, and multiple optical path deflectors 21 (multiple cells) arranged on the light guide plate 10. The multiple optical path deflectors 21 include multiple optical path deflector sets 21a, 21b, 21c, . . . (multiple deflectors) to deflect guided light to be emitted to form a stereoscopic image I in a space.

The light source 2 includes multiple light-emitting diodes (LEDs) 2a. Light emitted from the LEDs 2a is adjusted by an incident light adjuster 3 and then enters the light guide plate 10 through an incident surface 11. Although the light source 2 includes multiple LEDs in the present embodiment, the light source 2 may include a single LED.

The incident light adjuster 3 includes multiple lenses 3a in a one-to-one correspondence with the LEDs 2a. Each lens 3a reduces, increases, or maintains the divergence of light in an xy plane (described later) in a direction along an optical axis of light emitted from the corresponding LED 2a. The lenses 3a thus cause light emitted from the LEDs 2a to be closer to parallel light or guide the light over the entire area within the light guide plate 10. The angle of divergence of light guided by the light guide plate 10 may be 5° or less, or specifically, less than 1°. As another component to reduce the divergence angle of light in the xy plane within the light guide plate 10, for example, the incident light adjuster 3 may include a mask with openings each having a width narrower than a predetermined width in x-direction.

In the present embodiment or embodiments, light emitted from the LEDs 2a has an optical axis extending at an angle θ with respect to the emission surface 12 as shown in FIG. 2. For example, the angle θ, or a narrow angle formed by the optical axis of light emitted from the LEDs 2a and the emission surface 12, is about 20°. Thus, when light incident on the light guide plate 10 is close to parallel light, more light is guided within the light guide plate 10 while being repeatedly reflected by the emission surface 12 and a rear surface 13 than for incident light with an optical axis extending parallel to y-axis. Accordingly, more light may be allowed to enter the optical path deflectors 20 than for incident light with an optical axis extending parallel to y-axis.

The light guide plate 10 is formed from a transparent resin material with a relatively high refractive index. The material for the light guide plate 10 may be a polycarbonate (PC) resin, a polymethyl methacrylate (PMMA) resin, or glass.

The light guide plate 10 has the incident surface 11 that receives light from the light source 2, the emission surface 12 being a front surface of the light guide plate 10 through which light is emitted, and the rear surface 13 with the optical path deflectors 21.

In the present embodiment, light is emitted through the emission surface 12 of the light guide plate 10. The emitted light forms a stereoscopic image I in a space. The stereoscopic image I appears stereoscopic to a viewer. The stereoscopic image I refers to an image that appears stereoscopic at a position other than on the emission surface 12 of the light guide plate 10. The stereoscopic image I may be, for example, a two-dimensional image that appears at a position away from the emission surface 12 of the light guide plate 10. More specifically, the stereoscopic image I may be an image that appears stereoscopic, or may be an image having a two-dimensional shape that appears at a position other than on the optical device 1A. Although the stereoscopic image I is a real image located in the positive z-direction with respect to the emission surface 12 in the present embodiment, the stereoscopic image I may be a virtual image located in the negative z-direction with respect to the emission surface 12.

In the present embodiment, an orthogonal coordinate system including x-axis, y-axis, and z-axis may be used. In the present embodiment, z-direction is defined as a direction perpendicular to the emission surface 12, and the positive z-direction is defined as a direction from the rear surface 13 toward the emission surface 12. The y-direction is defined as a direction perpendicular to the incident surface 11, and the positive y-direction is defined as a direction in which light travels within the light guide plate 10. The x-axis is defined as a direction perpendicular to y-axis and z-axis, and the positive x-direction is defined as a direction from the left side toward the right side in FIG. 1. A plane parallel to an xy plane may be referred to as the xy plane, a plane parallel to a yz plane may be referred to as the yz plane, and a plane parallel to an xz plane may be referred to as the xz plane.

The light guide plate 10 has, on the rear surface 13, the multiple optical path deflectors 21 that deflect light guided within the light guide plate 10 to be emitted to form a stereoscopic image I as an image in a space. The multiple optical path deflectors 21 are two-dimensionally arranged at different positions, for example, in a matrix in the xy plane. The optical path deflectors 21 may be, for example, prisms.

In FIG. 2, light emitted from the light source 2 enters the light guide plate 10 through the incident surface 11 after passing through the incident light adjuster 3. The light that has entered the light guide plate 10 is guided while being totally internally reflected between the emission surface 12 and the rear surface 13. The optical path deflectors 21 then disrupt the total internal reflection conditions to deflect the light in specific directions. The light is then emitted through the emission surface 12.

The structure and the function of the optical path deflectors 21 will now be described.

Figure 3:
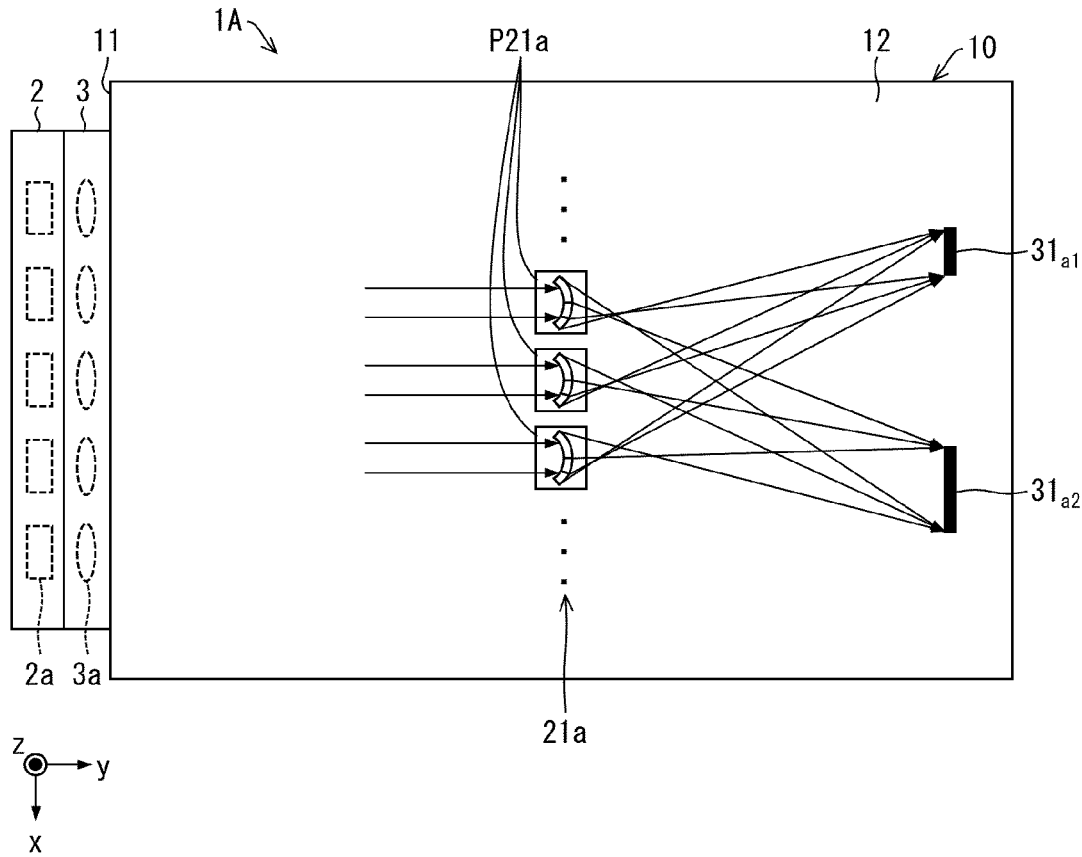
FIG. 3 is a diagram illustrating a plan view of an optical device according to one or more embodiments showing a portion for forming a stereoscopic image.
Figure 4:
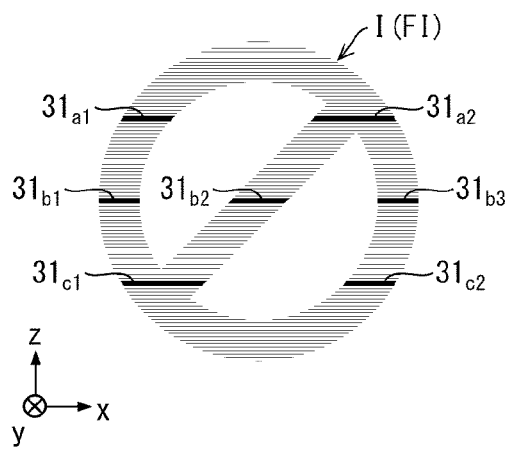
FIG. 4 is a diagram illustrating a front view of an example stereoscopic image formed by an optical device according to one or more embodiments.

The structure of the optical device 1A for forming a stereoscopic image I will now be described with reference to FIGS. 1, 3, and 4. FIG. 3 is a plan view of the optical device 1A showing a portion for forming a stereoscopic image I. FIG. 4 is a front view of an example stereoscopic image I formed by the optical device 1A.

As shown in FIG. 1, for example, the optical device 1A forms, as a stereoscopic image I, an image of a ring with a diagonal line inside that is a plane image FI on a stereoscopic imaging plane parallel to the xz plane (FIG. 4).

In the optical device 1A, light propagating within the light guide plate 10 may have a wide divergence in the yz plane. Thus, the incident light adjuster 3 does not reduce the divergence angle of light from the light source 2 in the yz plane. In other words, the divergence angle of light from the light source 2 in the yz plane is substantially unaffected by the incident light adjuster 3.

For example, the lenses 3a in the incident light adjuster 3 may be convex cylindrical lenses having a curvature in the xy plane and having substantially no curvature in the yz plane. The cylindrical lenses are, for example, biconvex.

The light guide plate 10 includes, on the rear surface 13, the multiple optical path deflector sets 21a, 21b, 21c, ... that function as the optical path deflectors 21. Each of the optical path deflector sets 21a, 21b, 21c, ... includes multiple prisms arranged in a direction parallel to x-axis. For example, the optical path deflector set 21a includes multiple prisms P21a. Similarly, the optical path deflector set 21b includes multiple prisms P21b. The optical path deflector set 21c includes multiple prisms P21c.

For example, the prisms P21a deflect incident light to be spread in a direction parallel to the xy plane. The light is then emitted through the emission surface 12. Light beams emitted through the prisms P21a through the emission surface 12 intersect with the stereoscopic imaging plane substantially at lines. As shown in FIGS. 1 and 3, each prism P21a causes two light beams to be emitted through the emission surface 12. The emitted two light beams intersect with the stereoscopic imaging plane at a line $31_{a1}$ and a line $31_{a2}$. As shown in FIG. 1, each prism P21a included in the optical path deflector set 21a causes light beams to be emitted through the emission surface 12. The light beams intersect with the stereoscopic imaging plane at the line $31_{a1}$ and the line $31_{a2}$. The line $31_{a1}$ and the line $31_{a2}$ are in a plane substantially parallel to the xy plane to form a part of the stereoscopic image I. Accordingly, light from the prisms P21a in the optical path deflector set 21a forms line images LI corresponding to the line $31_{a1}$ and the line $31_{a2}$. The light forming the images of the line $31_{a1}$ and the line $31_{a2}$ may be provided by at least two of the prisms P21a in the optical path deflector set 21a arranged at different positions in x-direction.

Each prism P21a in the optical path deflector set 21a causes incident light to be spread in x-direction in a plane parallel to the emission surface 12 to cause the light to have an intensity distribution corresponding to the images of the line $31_{a1}$ and the line $3_{1a2}$. The prism P21a then causes the light to be emitted through the emission surface 12. The light from the prisms P21a in the optical path deflector set 21a arranged in x-direction thus forms the images of the line $31_{a1}$ and the line $31_{a2}$.

Similarly, as shown in FIG. 1, each prism P21b in the optical path deflector set 21b deflects incident light to be spread in a direction parallel to the xy plane. The prism P21b then causes three light beams to be emitted through the emission surface 12. The three light beams emitted through the emission surface 12 intersect with the stereoscopic imaging plane at a line $31_{b1}$, a line $31_{b2}$, and a line $31_{b3}$. Each prism P21b included in the optical path deflector set 21b causes light beams to be emitted through the emission surface 12. The light beams intersect with the stereoscopic imaging plane at the lines $31_{b1}$, $31_{b2}$, and $31_{b3}$. Accordingly, each prism P21b in the optical path deflector set 21b deflects incident light to be spread in x-direction in a plane parallel to the emission surface 12 to have an intensity distribution corresponding to the images of the lines $31_{b1}$, $31_{b2}$, and $31_{b3}$. The prism P21b then causes the light to be emitted through the emission surface 12. The light from the prisms P21b in the optical path deflector set 21b arranged in x-direction thus forms the images of the lines $31_{b1}$, $31_{b2}$, and $31_{b3}$. The lines $31_{b1}$, $31_{b2}$, and $31_{b3}$ are in a plane substantially parallel to the xy plane to form a part of the stereoscopic image I.

The imaging positions of the lines $31_{b1}$, $31_{b2}$, and $31_{b3}$ and the imaging positions of the lines $31_{a1}$ and $31_{a2}$ are different from each other in z-direction in the stereoscopic imaging plane.

Similarly, as shown in FIG. 1, each prism P21c in the optical path deflector set 21c deflects incident light to be spread in a direction parallel to the xy plane. The prism P21c then causes two light beams to be emitted through the emission surface 12. The two light beams emitted through the emission surface 12 intersect with the stereoscopic imaging plane at a line $31_{c1}$ and a line $31_{c2}$. Each prism P21c included in the optical path deflector set 21c causes light beams to be emitted through the emission surface 12. The light beams intersect with the stereoscopic imaging plane at the lines $31_{c1}$ and $31_{c2}$. Accordingly, each prism P21c in the optical path deflector set 21c causes incident light to be spread in x-direction in a plane parallel to the emission surface 12 to cause the light to have an intensity distribution corresponding to the images of the lines $31_{c1}$ and $31_{c2}$. The prism P21c then causes the light to be emitted through the emission surface 12. The light from the prisms P21c in the optical path deflector set 21c arranged in x-direction thus forms the images of the lines $31_{c1}$ and $31_{c2}$. The lines $31_{c1}$ and $31_{c2}$ are in a plane substantially parallel to the xy plane to form a part of the stereoscopic image I.

The imaging positions of the lines $31_{c1}$ and $31_{c2}$, the imaging positions of the lines $31_{b1}$, $31_{b2}$, and $31_{b3}$, and the imaging positions of the lines $31_{a1}$ and $31_{a2}$ are different from one another in z-direction in the stereoscopic imaging plane.

In FIG. 1, as described above, the lines $31_{c1}$ and $31_{c2}$, the lines $31_{b1}$, $31_{b2}$, and $31_{b3}$, and the lines $31_{a1}$ and $31_{a2}$ are imaged at positions different from one another in z-direction in the stereoscopic imaging plane, and are thus viewable as being separate from one another. In actual use, the optical path deflector sets 21a, 21b, and 21c are first optical path deflector sets including a greater number of the optical path deflector sets 21a, 21b, 21c, . . . to allow the optical path deflector sets 21a, 21b, and 21c to be at shorter intervals in y-direction. In another embodiment, when the optical path deflector sets 21a, 21b, and 21c are at longer intervals in y-direction, the optical deflection angles of the prisms P21a, P21b, and P21c may be adjusted to cause the lines $31_{a1}$ and $31_{a2}$, the lines $31_{b1}$, $31_{b2}$, and $31_{b3}$, and the lines $31_{c1}$ and $31_{c2}$ to be imaged at positions closer to one another in z-direction. The plane image FI as an image of a ring with a diagonal line inside as the stereoscopic image I is thus viewable as shown in FIG. 4.

Accordingly, the optical device 1A gathers light beams from the prisms P21a, P21b, P21c, . . . in the two-dimensionally arranged optical path deflector sets 21a, 21b, 21c, . . . to cause the light beams to form the plane image FI in a space in which a viewer is located. The viewer may thus view the stereoscopic image I including the plane image FI from any position in a broad area extending in y-direction.

Shape of Optical Path Deflector Set

The shape of the prisms P21a, P21b, and P21c, . . . in the optical path deflector sets 21a, 21b, 21c, . . . for forming the plane image FI will now be described with reference to FIG. 5.

Figure 5:
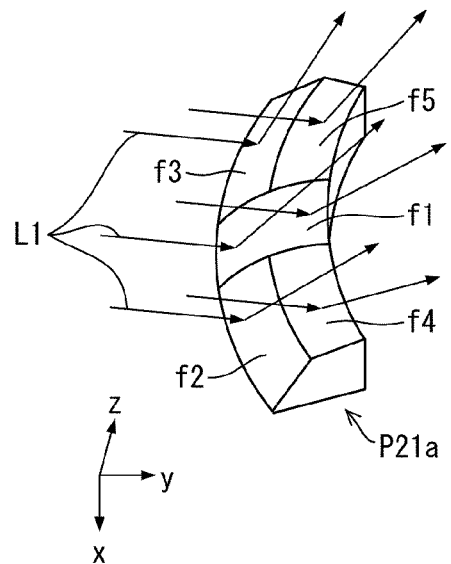
FIG. 5 is a diagram illustrating a perspective view of an example prism included in a light guide plate in an optical device according to one or more embodiments.

FIG. 5 is a perspective view of a prism P21a included in the light guide plate 10 in the optical device 1A.

As shown in the figure, the prism P21a in the optical path deflector set 21a is, for example, shaped substantially like a cutout from a ring with a trapezoidal cross section. The prism P21a has reflective surfaces f1, f2, f3, f4, and f5. The reflective surfaces f1, f2, f3, f4, and f5 are example optical surfaces as deflection surfaces that deflect light. The reflective surfaces f1, f2, f3, f4, and f5 are curved surfaces facing in different directions. As described above, the LEDs 2a each have an optical axis inclined at an angle θ to the emission surface 12 of the light guide plate 10 in the yz plane. Thus, when light incident on the light guide plate 10 is close to parallel light, more light is guided within the light guide plate 10 while being repeatedly reflected by the emission surface 12 and the rear surface 13 than for incident light with an optical axis extending parallel to y-axis, which may allow more light to be incident on the reflective surfaces f1, f2, f3, f4, and f5 than for incident light with an optical axis extending parallel to y-axis.

The reflective surface f1 is an upward slope curved in an arc in a direction parallel to light L1 guided within the light guide plate 10. The reflective surface f1 receives incident light L1 at a different angle from the emission surface 12 in accordance with the position of incidence on the reflective surface f1. Thus, the reflective surface f1 spreads the light L1 incident on the reflective surface f1 over, for example, a side 31 included in the stereoscopic image I as shown in FIG. 2. The side 31 is parallel to y-axis. Light reflected from the reflective surface f1 travels toward the side 31. Substantially no light from the reflective surface f1 travels in any direction other than toward the side 31. Thus, the light reflected from the reflective surface f1 is distributed, in the yz plane, at substantially angles alone in directions from the reflective surface f1 to the side 31. Accordingly, the reflective surface f1 modulates the intensity of incident light in the angular direction and causes the light to be emitted in the yz plane. The curved reflective surface f1 allows the light L1 being parallel light incident on the reflective surface f1 to form a line in an image.

As shown in FIG. 5, the reflective surfaces f2 and f3 extend in an arc with the reflective surface f1 between them in the prism P21a shaped like a ring with a trapezoidal cross section. Similarly to the reflective surface f1, the reflective surfaces f2 and f3 each are a slope extending partway up the prism P21a. The reflective surfaces f2 and f3 thus reflect the light L1 incident on the reflective surfaces f2 and f3 to cause the reflected light to spread over the areas of the line $31_{a1}$ and the line $31_{a2}$ in the stereoscopic image I. As shown in FIG. 1, the reflective surface f1 causes no line to appear between the line $31_{a1}$ and the line $31_{a2}$ in the stereoscopic image I.

As shown in FIG. 5, the reflective surfaces f4 and f5 are upward slopes defined by inflection lines in the reflective surfaces f4 and f5. The reflective surfaces f4 and f5 allow, for example, the line $31_{c1}$ and the line $31_{c2}$ in the stereoscopic image I to be formed as shown in FIG. 1.

Accordingly, the prism P21a shaped to have, for example, the reflective surfaces f1 to f5 allows the side 31, the lines $31_{a1}$ and $31_{a2}$, the lines $31_{b1}$, $31_{b2}$, and $31_{b3}$, and the lines $31_{c1}$ and $31_{c2}$ included in the plane image FI being the stereoscopic image I to be formed.

Example Use and Example Arrangement of Optical Path Deflector Sets

An example use and an example arrangement of the optical path deflector sets 21a, 21b, 21c, . . . will now be described with reference to FIG. 6.

Figure 6:
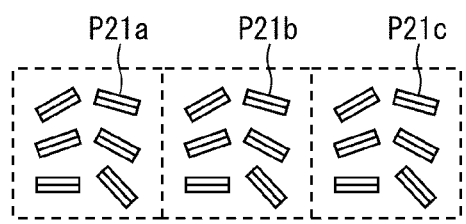
FIG. 6 is a diagram illustrating an example use and an example arrangement of optical path deflector sets according to one or more embodiments.

FIG. 6 is a diagram showing an example use and an example arrangement of the optical path deflector sets 21a, 21b, 21c, . . . . As shown in FIG. 6, for example, the optical path deflector sets 21a, 21b, and 21c include respective triangular prisms P21a, P21b, and P21c. The prisms P21a, P21b, and P21c are arranged in a matrix with three rows and two columns with a slight clearance between one another. The illustrated structure is a mere example, and the optical path deflector sets 21a, 21b, and 21c may have any other structure. For example, the optical path deflector sets 21a, 21b, and 21c may include the respective triangular prisms P21a, P21b, and P21c arranged in a matrix with three rows and three columns.

Structure of Light Guide Plate Allowing Luminance Level to Change in Accordance with Viewing Direction The structure of the light guide plate 10 for improved tone representation will now be described in detail with reference to, for example, FIG. 7.

Figure 7:
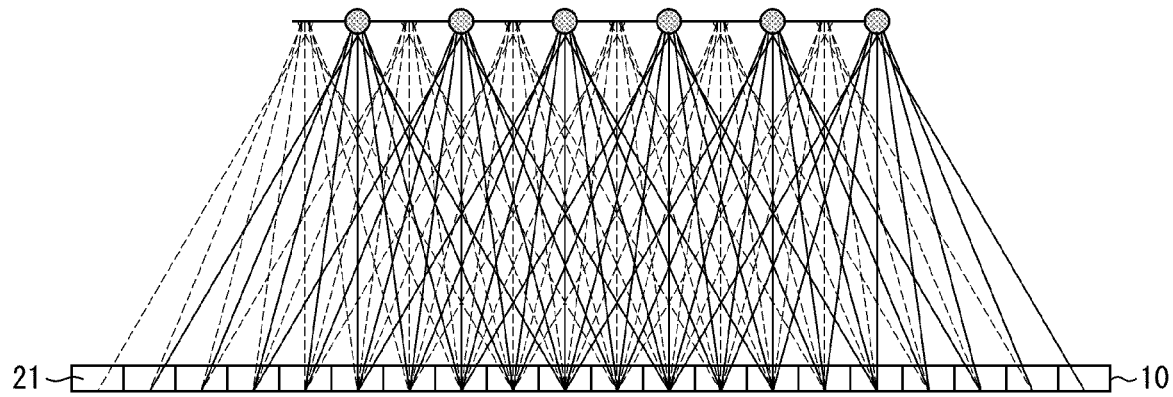
FIG. 7 is a diagram illustrating to describe light emitted from multiple optical path deflectors forming an image in the air according to one or more embodiments.
Figures 15, 16:
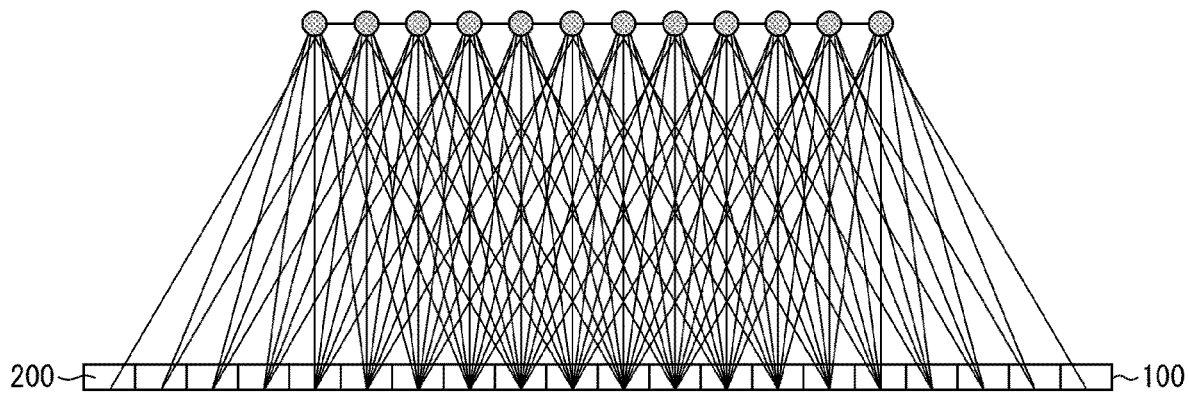
FIG. 15 is a diagram illustrating light emission on a light guide plate according to one or more embodiments for a tone value of 25.
FIG. 16 is a diagram illustrating a known light guide plate showing all optical path deflector sets that cause light to be emitted.
Figure 17:
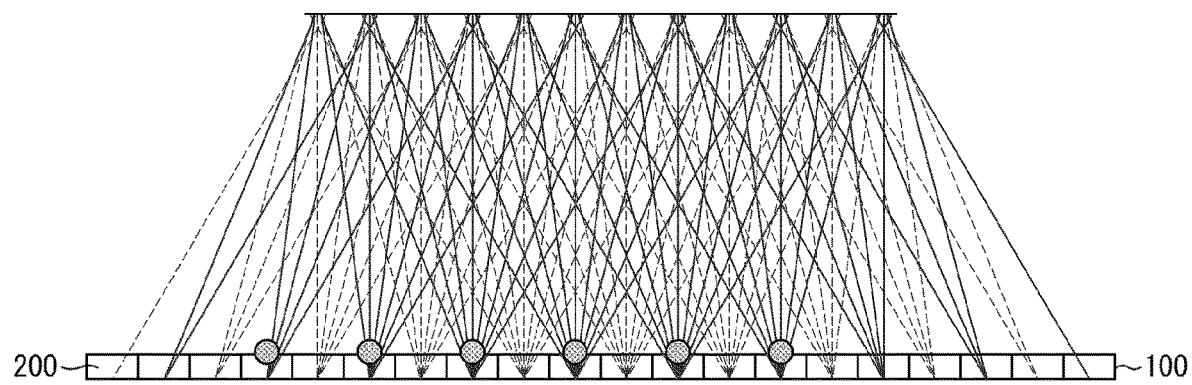
FIG. 17 is a diagram illustrating a known light guide plate with optical path deflector sets that cause light to be emitted and optical path deflector sets that do not cause light to be emitted, which are located alternately.

FIG. 7 is a diagram describing light emitted from multiple optical path deflectors 21 forming an image in the air. For ease of explanation, FIG. 16 will also be referred to. In FIG. 16, all optical path deflector sets 200 cause light to be emitted to form an image in the air. The tone value is 100 in the present state. The structure shown in FIG. 7 is designed to reproduce a tone value of 50, which is 50% of the tone value reproduced with the structure shown in FIG. 16. In FIG. 7, the solid lines indicate light being emitted, and the broken lines schematically indicate light not being emitted.

The light guide plate 10 includes the multiple optical path deflectors 21 arranged in a matrix. FIG. 7 is a cross-sectional view of the light guide plate 10. The multiple optical path deflectors 21 include multiple optical path deflector sets 21a, 21b, 21c, . . . (not shown) that deflect light incident on the light guide plate 10 in multiple directions for emission. A first optical path deflector 21 and a second optical path deflector 21 adjacent to each other in the multiple optical path deflectors 21 will now be described.

The first optical path deflector 21 includes a first prism that deflects light within a first angle range to display multiple dots included in a halftone line or surface of a stereoscopic image. The first optical path deflector 21 does not include a second prism that deflects light within a second angle range adjacent to the first angle range. The first optical path deflector 21 includes a third prism that deflects light within a third angle range adjacent to the second angle range. The second optical path deflector 21 does not include the first prism, includes the second prism, and does not include the third prism.

The difference between the first angle range and the second angle range may be 6 degrees or less, or more specifically, 3 degrees or less. For an interocular distance for a typical adult being about 6 cm, the two eyes and a position 50 cm away form an angle of 6.8 degrees. The difference between the first angle range and the second angle range may thus be 6.8 degrees or less. The difference may be 3 degrees, which is 50% of 6 degrees, or less to accommodate a situation involving a longer distance and a situation involving a shorter interocular distance. The above also applies to the difference between the second angle range and the third angle range and the difference between any two subsequent angle ranges.

Figures 8, 9:
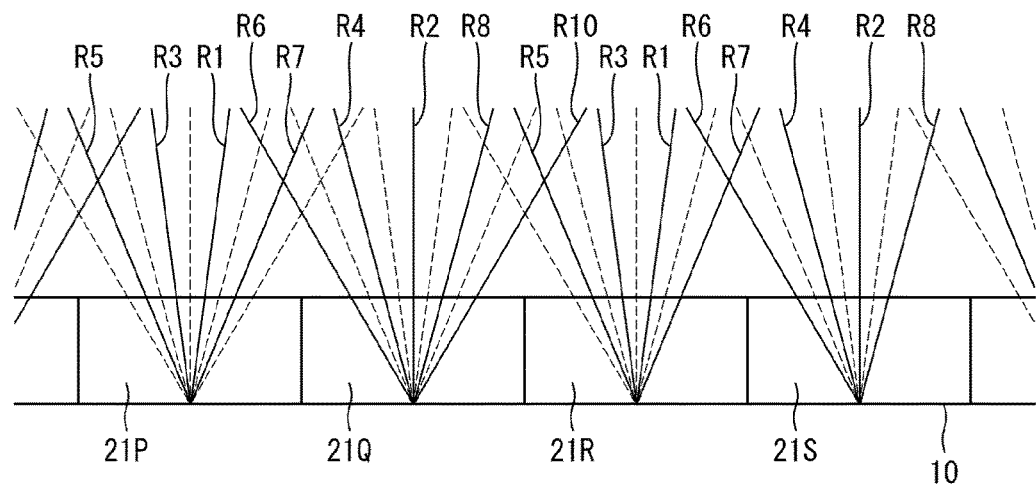
FIG. 8 is a diagram illustrating a main part, such as is shown in FIG. 7 according to one or more embodiments.
FIG. 9 is a diagram illustrating light emission on a light guide plate according to one or more embodiments.

The first optical path deflector 21 and the second optical path deflector 21 with the above structure are located periodically and alternately on the light guide plate 10 shown in FIG. 7. FIG. 8 shows light being emitted from the light guide plate 10 with the above structure.

FIG. 8 is a diagram of a main part of FIG. 7. FIG. 8 is an enlarged view of four optical deflectors 21P, 21Q, 21R, and 21S.

The optical deflector 21P deflects light in directions denoted with R1, R3, R5, and R7. More specifically, the optical deflector 21P includes multiple prisms that deflect light in the directions denoted with R1, R3, R5, and R7. However, the optical deflector 21P does not deflect light in directions denoted with R2, R4, R6, R8, and R10. More specifically, the optical deflector 21P includes no prism that deflects light in a direction denoted with R2, R4, R6, R8, or R10.

The optical deflector 21Q deflects light in directions denoted with R2, R4, R6, R8, and R10. More specifically, the optical deflector 21Q includes multiple prisms that deflect light in the directions denoted with R2, R4, R6, R8, and R10. However, the optical deflector 21Q does not deflect light in directions denoted with R1, R3, R5, and R7. More specifically, the optical deflector 21Q includes no prism that deflects light in a direction denoted with R1, R3, R5, or R7.

The optical deflector 21R deflects light in directions denoted with R1, R3, R5, and R7. More specifically, the optical deflector 21R includes multiple prisms that deflect light in the directions denoted with R1, R3, R5, and R7. However, the optical deflector 21R does not deflect light in directions denoted with R2, R4, R6, R8, and R10. More specifically, the optical deflector 21R includes no prism that deflects light in a direction denoted with R2, R4, R6, R8, or R10.

The optical deflector 21S deflects light in directions denoted with R2, R4, R6, and R8. More specifically, the optical deflector 21S includes multiple prisms that deflect light in the directions denoted with R2, R4, R6, and R8. However, the optical deflector 21S does not deflect light in directions denoted with R1, R3, R5, and R7. More specifically, the optical deflector 21S includes no prism that deflects light in a direction denoted with R1, R3, R5, or R7 as will be further described with reference to FIG. 9.

FIG. 9 is a diagram illustrating light emission on the light guide plate 10. The light guide plate 10 includes the multiple optical path deflectors 21 arranged in a matrix. In the upper part of FIG. 9, optical path deflectors that deflect light in predetermined directions (directions A) are marked. The directions A correspond to the directions denoted with R1, R3, R5, and R7 described with reference to FIG. 8. In the lower part of FIG. 9, optical path deflectors that deflect light in predetermined directions (directions B) are marked. The directions B correspond to the directions denoted with R2, R4, R6, R8, and R10 described with reference to FIG. 8. Accordingly, each optical path deflector 21 has different prisms skipped (eliminated) in accordance with a slight change in the viewing angle, which causes a change in light emission on the light guide plate 10 between the directions A and the directions B.

Figures 10, 11:
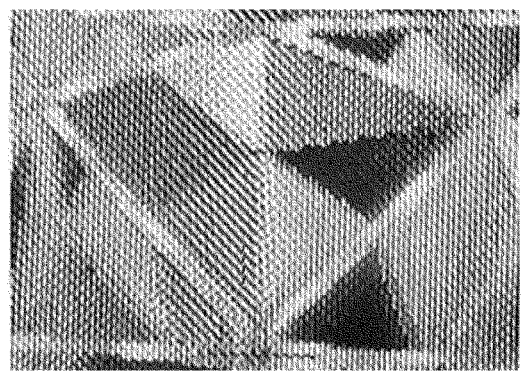
FIG. 10 a diagram illustrating an example stereoscopic image with improved tone representation displayed in a space by a light guide plate according to one or more embodiments.
FIG. 11 is a diagram illustrating light emission on a light guide plate according to one or more embodiments for a tone value of 100.

In the above structure, as shown in FIG. 7, the light guide plate 10 displays a predetermined image in a space with image points in the air reduced to 50%. The light guide plate 10 can thus reproduce a tone value of 50, which is 50% of the structure (the tone value of 100) reproduced with the structure shown in FIG. 16. Accordingly, the light guide plate 10 achieves improved tone representation as compared with the known technique. FIG. 10 shows one such example.

FIG. 10 shows an example stereoscopic image with improved tone representation displayed in a space by the light guide plate 10. As shown in the figure, the stereoscopic image in a space appears stereoscopic and has each of its faces having tonal gradation. Further, the light guide plate 10 has different prisms skipped (eliminated) in accordance with a slight change in the viewing angle. The light guide plate 10 thus produces another advantageous effect of reducing prisms to be formed, thus reducing the time taken for forming prisms.

Second Embodiment (Tone Value of 50)

A second embodiment will now be described. For ease of explanation, the components having the same functions as the components described in the above embodiments are given the same reference numerals as those components, and will not be described repeatedly. The same applies to other embodiments described later.

The structure for reproducing a tone value of 50 will now be described with reference to, for example, FIG. 11. FIG. 11 is a diagram illustrating light emission on the light guide plate 10 for a tone value of 100. FIG. 12 is a diagram illustrating light emission on the light guide plate 10 for a tone value of 50. In FIGS. 11 and 12, multiple optical path deflectors 21 are arranged in a matrix.

As shown in FIG. 11, the optical path deflectors 21 for a tone value of 100 deflect light in any predetermined direction. In FIG. 11, all the optical path deflectors 21 in a matrix are marked.

For a tone value of 50, as described with reference to FIG. 9, each optical path deflector 21 deflects light in predetermined directions, such as, in directions denoted with R1, R3, R5, and R7 or in directions denoted with R2, R4, R6, R8, and R10. Thus, different positions are marked between the upper part (arrangement A) and the lower part (arrangement B) of FIG. 12.

The above described arrangement will be described in more detail as follows. FIG. 12 shows matrices each with eight rows and eight columns as an example. When the position of an optical path deflector 21 in the matrix is represented by (row number, column number), for example, positions (1, 1) and (2, 2) in the arrangement A are marked.

In the arrangement B, positions (1, 2) and (2, 1) are marked. Other positions in the matrices will not be described. As shown in the figure, marked positions are alternate between the upper part (arrangement A) and the lower part (arrangement B) of FIG. 12. With the arrangement A and the arrangement B being alternate to each other, the light guide plate 10 reduces image points in the air to 50% and reproduces a tone value of 50, which is 50% of the tone value of 100 reproduced with the structure shown in FIG. 11.

Another structure for reproducing a tone value of 50 will now be described with reference to FIG. 13. FIG. 13 is a diagram illustrating light emission on the light guide plate 10 for a tone value of 50.

Unlike the arrangements A and B in FIG. 12, positions (1, 1) and (2, 1) are marked in an arrangement A in FIG. 13. In an arrangement B, positions (1, 2) and (2, 2) are marked. In other words, marked positions are alternate between the upper part (arrangement A) and the lower part (arrangement B) of FIG. 13. Other positions in the matrices will not be described. With positions in the arrangement A and positions in the arrangement B being alternate to each other, the light guide plate 10 reduces image points in the air to 50% and reproduces a tone value of 50, which is 50% of the tone value of 100 reproduced with the structure shown in FIG. 11.

With the structure in FIG. 12 or 13, the light guide plate 10 displays a predetermined image in a space and reproduces a tone value of 50, which is 50% of the tone value of 100 reproduced with the structure shown in FIG. 11. Accordingly, the light guide plate 10 achieves improved tone representation as compared with the known technique. Although not shown in the figure, to reproduce a tone value of 50, which is 50% of the tone value of 100 reproduced with the structure shown in FIG. 11, positions (1, 2) and (2, 2) may be marked in the arrangement A and positions (1, 1) and (2, 1) may be marked in the arrangement B.

Third Embodiment (Tone Value of 25)

The structure for reproducing a tone value of 25 will now be described with reference to FIGS. 14 and 15. FIGS. 14 and 15 each are a diagram illustrating light emission on the light guide plate 10 for a tone value of 25. In FIGS. 14 and 15, multiple optical path deflectors 21 are arranged in a matrix. The position of an optical path deflector 21 in the matrix will also be represented by (row number, column number).

First to fourth optical path deflectors 21 of the multiple optical path deflectors 21 will be described first.

The first optical path deflector 21 includes a first prism that deflects light within a first angle range to display multiple dots included in a halftone line or surface of a stereoscopic image. The first optical path deflector 21 does not include a second prism that deflects light within a second angle range adjacent to the first angle range. The second optical path deflector 21 does not include the first prism and includes the second prism.

The first optical path deflector 21 and the second optical path deflector 21 each include no third prism that deflects light within a third angle range adjacent to the second angle range and include no fourth prism that deflects light within a fourth angle range adjacent to the third angle range.

The light guide plate 10 further includes the third optical path deflector 21 and the fourth optical path deflector 21. The third optical path deflector 21 includes the third prism and does not include the first prism, the second prism, and the fourth prism. The fourth optical path deflector 21 includes the fourth prism and does not include the first prism to the third prism.

The first to fourth optical path deflectors 21 with the above structure are located periodically on the light guide plate 10.

FIG. 14 shows arrangements A to D. Positions (1, 1), (1, 2), (2, 1), and (2, 2) in the arrangements A to D will now be described. In the arrangement A, a position (1, 1) alone is marked. In the arrangement B, a position (1, 2) alone is marked. In the arrangement C, a position (2, 1) alone is marked. In the arrangement D, a position (2, 2) alone is marked. Other positions in the matrices will not be described. As shown in the figure, marked positions are periodically changed between the arrangements A to D in FIG. 14.

Accordingly, each optical path deflector 21 has different prisms skipped (eliminated) in accordance with a slight change in the viewing angle. For example, the arrangement A causes light to be deflected in directions R1 and R5 alone, the arrangement B causes light to be deflected in directions R2 and R6 alone, the arrangement C causes light to be deflected in directions R3 and R7 alone, and the arrangement D causes light to be deflected in directions R4 and R8 alone.

In the above structure, the light guide plate 10 displays a predetermined image in a space with image points in the air reduced to 25%. The light guide plate 10 can thus reproduce a tone value of 25, which is 25% of the tone value of 100 reproduced with the structure shown in FIG. 11.

Unlike the arrangements A to D in FIG. 14, a position (1, 1) is marked in an arrangement A, a position (2, 1) in an arrangement B, a position (1, 2) in an arrangement C, and a position (2, 2) in an arrangement D in FIG. 15. Also with prisms skipped (eliminated) differently Accordingly, the light guide plate 10 can reproduce a tone value of 25, which is 25% of the tone value of 100 reproduced with the structure shown in FIG. 11.

Fourth Embodiment (Variations)

In the present embodiment, the structures for reproducing more variations in tone value other than 50% and 25% will be described.

In the above embodiments described with reference to FIGS. 12 to 15, a 2×2-matrix is used as one unit. When, for example, a 3×3-matrix is used as one unit, tone representation with 9 (3×3) grades can be created. When a 3×2-matrix is used as one unit, tone representation of 6 (3×2) grades can also be created. When a 2×2-matrix is used as one unit, a tone value of 75 can be reproduced.

In the present embodiment, as in other embodiments, each optical path deflector 21 has different prisms skipped (eliminated) in accordance with a slight change in the viewing angle. The light guide plate can thus display a stereoscopic image with improved tone representation in a space.

Figure 18:
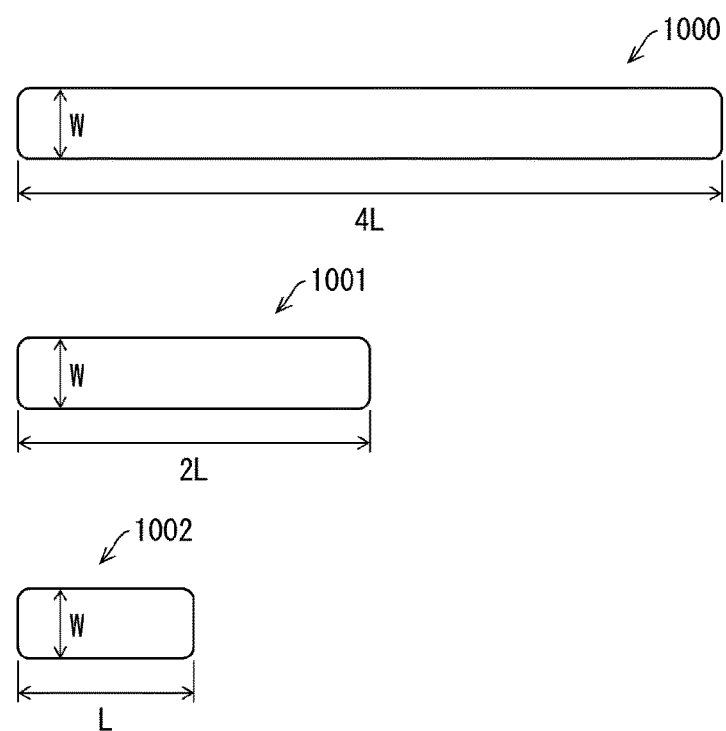
FIG. 18 is a diagram illustrating a schematic top view of triangular prisms with different lengths included in an optical path deflector set.

Further, in the present embodiment and above described embodiments, prisms included in the optical path deflector 21 may include at least one prism differing from the other prisms in at least a length or a height. As described with reference to FIG. 18, for example, a prism with a length reduced by half has brightness reduced to 50% and the tone value lowered by 50%. Similarly, a prism with a height (width) reduced by half has brightness reduced to 50% and the tone value lowered by 50%.

For example, the structure in FIG. 12 that reproduces a tone value of 50 including all the prisms having a length reduced by half has brightness reduced by half and can thus reproduce a tone value of 25. Similarly, the structure in FIG. 14 that reproduces a tone value of 25 including all the prisms having a length reduced by half has brightness reduced by half and can thus reproduce a tone value lowered by half.

Accordingly, the structure with each optical path deflector 21 having different prisms skipped (eliminated) in accordance with a slight change in the viewing angle may be combined with the structure with one or more prisms having at least a different length or a different height. Accordingly, the length of one or more prisms may be first reduced to 50 μm, and the height (width) of the one or more prisms may then be reduced, which may allow the light guide plate to display a stereoscopic image with further improved tone representation in a space.

Applicability to Display Device, Input Device, Amusement Apparatus, and Other Apparatuses A display device including the light guide plate 10 according to one or more embodiments and a light source (e.g., an LED) that emits light incident on the light guide plate 10 also falls within the technical scope.

An input device including the display device and a sensor 50 (refer to FIG. 1) that is near a stereoscopic image I formed in a space or that detects an object (e.g., a human digit) near the stereoscopic image I also falls within the technical scope. The sensor 50 may be a known sensor such as a limited reflective sensor that detects an object at a predetermined detection position.

An apparatus of any type including the display device also falls within the technical scope. Examples of such an apparatus include amusement apparatuses (pachinko machines, slot machines, and other devices and machines used in, for example, amusement arcades and casinos), toys, in-vehicle devices, and consumer electronics.

One or more embodiments disclosed herein should not be construed to be restrictive, but may be modified within the spirit and scope of the claimed disclosure. The technical features disclosed in different embodiments may be combined in other embodiments within the technical scope.

The invention claimed is:

1. A light guide plate for displaying a predetermined image as a real image or a virtual image in a space, the light guide plate comprising:
   a plurality of cells arranged in a matrix, wherein
   each of the plurality of cells comprises a plurality of deflectors configured to deflect light incident on the light guide plate in a plurality of directions for emission, and
   the plurality of cells comprise a first cell and a second cell located periodically, the first cell comprises a first deflector configured to deflect light within a first angle range to display a plurality of dots comprised in a halftone line or a halftone surface of the predetermined image, the first cell is free of a second deflector configured to deflect light within a second angle range adjacent to the first angle range, and the second cell is free of the first deflector and comprises the second deflector.

2. The light guide plate according to claim 1, wherein the first cell comprises a third deflector configured to deflect light within a third angle range adjacent to the second angle range, and the second cell is free of the third deflector.

3. The light guide plate according to claim 1, wherein the first cell and the second cell are located alternately.

4. The light guide plate according to claim 1, wherein each of the first cell and the second cell is free of a third deflector configured to deflect light within a third angle range adjacent to the second angle range and is free of a fourth deflector configured to deflect light within a fourth angle range adjacent to the third angle range, the light guide plate further comprises
- a third cell comprising the third deflector and being free of the first deflector, the second deflector, and the fourth deflector, and
- a fourth cell comprising the fourth deflector and being free of the first deflector, the second deflector, and the third deflector, and the first cell, the second cell, the third cell, and the fourth cell are located periodically.

5. The light guide plate according to claim 1, wherein the plurality of deflectors comprise at least one deflector with at least a length or a height different from at least a length or a height of another of the plurality of deflectors.

6. A display device, comprising:
the light guide plate according to any one of claim 1; and
a light source configured to emit light to be incident on the light guide plate.

7. An input device, comprising:
the display device according to claim 6; and
a sensor configured to detect an object.

8. An apparatus, comprising:
the display device according to claim 6.

9. The light guide plate according to claim 2, wherein the first cell and the second cell are located alternately.

10. A display device, comprising:
the light guide plate according to claim 2; and
a light source configured to emit light to be incident on the light guide plate.

11. A display device, comprising:
the light guide plate according to claim 3; and
a light source configured to emit light to be incident on the light guide plate.

12. A display device, comprising:
the light guide plate according to claim 4; and
a light source configured to emit light to be incident on the light guide plate.

13. A display device, comprising:
the light guide plate according to claim 5; and
a light source configured to emit light to be incident on the light guide plate.

14. An input device, comprising:
the display device according to claim 10; and
a sensor configured to detect an object.

15. An input device, comprising:
the display device according to claim 11; and
a sensor configured to detect an object.

16. An input device, comprising:
the display device according to claim 12; and
a sensor configured to detect an object.

17. An input device, comprising:
the display device according to claim 13; and
a sensor configured to detect an object.

18. An apparatus, comprising:
the display device according to claim 10.

19. An apparatus, comprising:
the display device according to claim 11.

20. An apparatus, comprising:
the display device according to claim 12.

* * * * *